United States Patent
Gururajan et al.

(10) Patent No.: US 11,299,607 B2
(45) Date of Patent: Apr. 12, 2022

(54) POLYETHYLENE SHEETS

(71) Applicant: ExxonMobil Chemical Patents Inc., Baytown, TX (US)

(72) Inventors: Giriprasath Gururajan, Missouri City, TX (US); Wen Li, Houston, TX (US); David B. Dunaway, Sao Paulo (BR); Steven A. Best, The Woodlands, TX (US); Etienne R. H. Lernoux, Longueville (BE)

(73) Assignee: Exxon Mobil Chemical Patents Inc., Baytown, TX (US)

( * ) Notice: Subject to any disclaimer, the term of this patent is extended or adjusted under 35 U.S.C. 154(b) by 548 days.

(21) Appl. No.: 16/082,026

(22) PCT Filed: Feb. 8, 2017

(86) PCT No.: PCT/US2017/016893
§ 371 (c)(1),
(2) Date: Sep. 4, 2018

(87) PCT Pub. No.: WO2017/184234
PCT Pub. Date: Oct. 26, 2017

(65) Prior Publication Data
US 2020/0291211 A1  Sep. 17, 2020

Related U.S. Application Data

(60) Provisional application No. 62/326,441, filed on Apr. 22, 2016.

(51) Int. Cl.
*C08L 23/08* (2006.01)
*C08J 5/18* (2006.01)
*C08L 23/12* (2006.01)
*B32B 27/32* (2006.01)

(52) U.S. Cl.
CPC ........ *C08L 23/0815* (2013.01); *B32B 27/327* (2013.01); *C08J 5/18* (2013.01); *C08L 23/12* (2013.01); *B32B 2250/02* (2013.01); *B32B 2250/03* (2013.01); *B32B 2250/04* (2013.01); *B32B 2250/242* (2013.01); *B32B 2307/732* (2013.01); *C08L 2205/025* (2013.01); *C08L 2207/066* (2013.01)

(58) Field of Classification Search
CPC ......... C08L 23/0815; C08L 23/12; C08J 5/18; B32B 27/327
USPC ...................................................... 428/213
See application file for complete search history.

(56) References Cited

U.S. PATENT DOCUMENTS

| | | | |
|---|---|---|---|
| 3,000,276 A | 9/1961 | Foulger | |
| 6,182,412 B1 | 2/2001 | Traxler | |
| 6,524,029 B2 | 2/2003 | Norbert et al. | |
| 6,956,088 B2 * | 10/2005 | Farley | B29C 48/92 526/113 |

(Continued)

FOREIGN PATENT DOCUMENTS

| | | |
|---|---|---|
| WO | 2010/027396 A | 3/2010 |
| WO | 2010/043560 A | 4/2010 |

(Continued)

*Primary Examiner* — Tahseen Khan
(74) *Attorney, Agent, or Firm* — ExxonMobil Chemical Patents Inc.-Law Department (57) ABSTRACT

Sheets made from metallocene-catalyzed polyethylene polymers, optionally, with other polymers, are disclosed.

19 Claims, 2 Drawing Sheets

(56) References Cited

U.S. PATENT DOCUMENTS

| | | | |
|---|---|---|---|
| 9,085,899 B1 | 7/2015 | Bertrand | |
| 2004/0053022 A1* | 3/2004 | Ohlsson | C08L 23/06 |
| | | | 428/213 |
| 2009/0297810 A1 | 12/2009 | Fiscus et al. | |
| 2010/0055432 A1* | 3/2010 | Etherton | C08F 210/16 |
| | | | 428/219 |
| 2011/0177313 A1* | 7/2011 | Chai | C08F 210/16 |
| | | | 428/220 |
| 2015/0291748 A1* | 10/2015 | Malakoff | B32B 27/08 |
| | | | 428/523 |
| 2017/0081445 A1* | 3/2017 | Chai | B29C 48/10 |

FOREIGN PATENT DOCUMENTS

| | | | | |
|---|---|---|---|---|
| WO | WO-2014042898 A2 * | 3/2014 | | C08J 5/18 |
| WO | WO-2014058660 A1 * | 4/2014 | | C09J 123/0815 |
| WO | WO-2014070385 A1 * | 5/2014 | | C08J 5/18 |
| WO | 2014/099356 A | 6/2014 | | |
| WO | WO-2014099356 A2 * | 6/2014 | | B32B 27/327 |
| WO | WO-2014132541 A1 * | 9/2014 | | B32B 27/06 |
| WO | WO-2015123172 A1 * | 8/2015 | | C08F 210/16 |
| WO | WO-2015157876 A1 * | 10/2015 | | B29C 48/21 |
| WO | 2017/027101 A | 2/2017 | | |
| WO | 2017/095501 A | 6/2017 | | |
| WO | 2017/165004 A | 9/2017 | | |
| WO | 2017/184234 A | 10/2017 | | |

\* cited by examiner

Figure 1 a) Melt strength at 190 °C and b) small-angle oscillatory shear at 190 °C

Figure 2

Figure 2. Water vapor barrier performance of neat PE1 and 70/30 (wt %) PE 1/Z-N C$_4$-LL 1001 blend films with change in thickness

POLYETHYLENE SHEETS

CROSS REFERENCE OF RELATED APPLICATIONS

This application is a National Phase Application of International Application No. PCT/US2017/016893, filed on Feb. 8, 2017, and claims the benefit of Ser. No. 62/326,441, filed on Apr. 22, 2016, the disclosure of which is incorporated by reference in its entirety.

FIELD OF THE INVENTION

The present invention generally relates to sheets made from metallocene-catalyzed polyethylene polymers, optionally, including other polymers.

BACKGROUND OF THE INVENTION

Metallocene polyethylene (mPE) resins such as those available from ExxonMobil Chemical Company, Houston, Tex., have revolutionized the plastics industry by improving upon polymer properties that have enhanced several end use applications and created several new applications. In general, mPE provides for a good balance of operational stability, extended output, versatility with higher alpha olefin (HAO) performance, toughness and strength, good optical properties, down gauging opportunities, and resin sourcing simplicity. See, for example, U.S. Ser. No. 62/313,502, filed Mar. 25, 2016, U.S. Patent Application Publication Nos. 2009/0297810, 2015/0291748, U.S. Pat. No. 6,956,088, and WO 2014/099356. However, for certain applications, more improvements are still required.

In particular, sheets made from polyolefin resins are often used as underslab water vapor retarder/barrier liners. See, for example, U.S. Pat. Nos. 3,000,276, 6,182,412, 6,524,029, and 9,085,899. These liners can help keep out moisture in buildings and reduce mold and fungi, thereby, protecting the foundation and improving the indoor air quality. Thus, for the construction and building industry, it is very important to have liners made from polyolefin sheets that offer high tensile strength, high puncture resistance, and ultra-low moisture vapor permeability. For example, in addition to meeting a permeance rating of 0.1 perms (ASTM E 1745 Class-A Specification), there is also a demand for high mechanical integrity such as puncture resistance and tensile strength that are critical during the construction phase of buildings so as to withstand foot traffic and other extreme conditions during construction. Unfortunately, commercially available liners do not offer simple cost-effective solutions or a good balance of these product properties.

Thus, there remains a need for improvements in sheets that are employed as industrial and construction liners. Such sheets should demonstrate a good balance of one or more of dart drop impact strength, tensile strength, water vapor transmission, the flexibility to reformulate, down gauging possibilities, and melt strength to enable enhanced performance and provide easy processing.

SUMMARY OF THE INVENTION

In a class of embodiments, the invention provides for a sheet made from at least one polyethylene polymer comprising from 75.0 mol % to 100.0 mol % ethylene derived units and having: a density of from 0.910 g/cm$^3$ to 0.923 g/cm$^3$, a melt index ($I_{2.16}$) of from 0.1 g/10 min to 1.2 g/10 min, a melt index ratio ($I_{21.6}/I_{2.16}$) of from 20 to 35, and a weight average molecular weight ($M_w$) of from 150,000 g/mol to 400,000 g/mol; wherein the sheet has a thickness of ≥5 mil (127 µm), a dart drop impact strength (DIS) of ≥2,200 g.

Other embodiments of the invention are described, claimed herein and are apparent by the following disclosure.

DETAILED DESCRIPTION OF ILLUSTRATIVE EMBODIMENTS

Before the present polymers, compounds, components, compositions, and/or methods are disclosed and described, it is to be understood that unless otherwise indicated this invention is not limited to specific polymers, compounds, components, compositions, reactants, reaction conditions, ligands, metallocene structures, or the like, as such may vary, unless otherwise specified. It is also to be understood that the terminology used herein is for the purpose of describing particular embodiments only and is not intended to be limiting.

It must also be noted that, as used in the specification and the appended claims, the singular forms "a," "an" and "the" include plural referents unless otherwise specified.

Definitions

For the purposes of this disclosure, the following definitions will apply, unless otherwise stated:

molecular weight distribution ("MWD") is equivalent to the expression $M_w/M_n$. The expression $M_w/M_n$ is the ratio of the weight average molecular weight ($M_w$) to the number average molecular weight ($M_n$). The weight average molecular weight is given by $$M_w = \frac{\sum_i n_i M_i^2}{\sum_i n_i M_i}$$

the number average molecular weight is given by $$M_n = \frac{\sum_i n_i M_i}{\sum_i n_i}$$

the z-average molecular weight is given by $$M_z = \frac{\sum_i n_i M_i^3}{\sum_i n_i M_i^2}$$

where $n_i$ in the foregoing equations is the number fraction of molecules of molecular weight $M_i$. Measurements of $M_w$, $M_z$, and $M_n$ are determined by Gel Permeation Chromatography. The measurements proceed as follows. Gel Permeation Chromatography (Agilent PL-220), equipped with three in-line detectors, a differential refractive index detector (DRI), a light scattering (LS) detector, and a viscometer, is used. Experimental details, including detector calibration, are described in: T. Sun, P. Brant, R. R. Chance, and W. W. Graessley, Macromolecules, Volume 34, Number 19, pp. 6812-6820, (2001). Three Agilent PLgel 10 µm Mixed-B LS columns are used. The nominal flow rate is 0.5 mL/min, and the nominal injection volume is 300 µL. The various transfer lines, columns, viscometer and differential refractometer (the DRI detector) are contained in an oven maintained at 145° C. Solvent for the experiment is prepared by dissolving 6 grams of butylated hydroxytoluene as an antioxidant in 4 liters of Aldrich reagent grade 1,2,4-trichlorobenzene (TCB). The TCB mixture is then filtered through a 0.1 µm Teflon filter. The TCB is then degassed with an online degasser before entering the GPC-3D. Polymer solutions are prepared by placing dry polymer in a glass container, adding the desired amount of TCB, then heating the mixture at 160° C. with continuous shaking for about 2 hours. All quantities are measured gravimetrically. The TCB densities used to express the polymer concentration in mass/volume units are 1.463 g/ml at about 21° C. and 1.284 g/ml at 145° C. The injection concentration is from 0.5 to 2.0 mg/ml, with lower concentrations being used for higher molecular weight samples. Prior to running each sample, the DRI detector and the viscometer are purged. The flow rate in the apparatus is then increased to 0.5 ml/minute, and the DRI is allowed to stabilize for 8 hours before injecting the first sample. The LS laser is turned on at least 1 to 1.5 hours before running the samples. The concentration, c, at each point in the chromatogram is calculated from the baseline-subtracted DRI signal, $I_{DRI}$, using the following equation:

$$c = K_{DRI} I_{DRI} / (dn/dc)$$

where $K_{DRI}$ is a constant determined by calibrating the DRI, and (dn/dc) is the refractive index increment for the system. The refractive index, n=1.500 for TCB at 145° C. and λ=690 nm. Units on parameters throughout this description of the GPC-3D method are such that concentration is expressed in g/cm³, molecular weight is expressed in g/mole, and intrinsic viscosity is expressed in dL/g.

The LS detector is a Wyatt Technology High Temperature DAWN HELEOS. The molecular weight, M, at each point in the chromatogram is determined by analyzing the LS output using the Zimm model for static light scattering (M. B. Huglin, LIGHT SCATTERING FROM POLYMER SOLUTIONS, Academic Press, 1971):

$$\frac{K_o c}{\Delta R(\theta)} = \frac{1}{MP(\theta)} + 2A_2 c$$

Here, $\Delta R(\theta)$ is the measured excess Rayleigh scattering intensity at scattering angle θ, c is the polymer concentration determined from the DRI analysis, $A_2$ is the second virial coefficient. $P(\theta)$ is the form factor for a monodisperse random coil, and $K_O$ is the optical constant for the system:

$$K_o = \frac{4\pi^2 n^2 (dn/dc)^2}{\lambda^4 N_A}$$

where $N_A$ is Avogadro's number, and (dn/dc) is the refractive index increment for the system, which take the same value as the one obtained from DRI method. The refractive index, n=1.500 for TCB at 145° C. and λ=657 nm.

A high temperature Viscotek Corporation viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\Theta_s$, for the solution flowing through the viscometer is calculated from their outputs. The intrinsic viscosity, [η], at each point in the chromatogram is calculated from the following equation:

$$\eta_s = c[\eta] + 0.3(c[\eta])^2$$

where c is concentration and was determined from the DRI output.

The branching index ($g'_{vis}$) is calculated using the output of the GPC-DRI-LS-VIS method as follows. The average intrinsic viscosity, $[\eta]_{avg}$, of the sample is calculated by:

$$[\eta]_{avg} = \frac{\Sigma c_i [\eta]_i}{\Sigma c_i}$$

where the summations are over the chromatographic slices, i, between the integration limits.

The branching index $g'_{vis}$ is defined as:

$$g'vis = \frac{[\eta]_{avg}}{kM_v^\alpha}$$

$M_v$ is the viscosity-average molecular weight based on molecular weights determined by LS analysis. Z average branching index ($g'_{zave}$) is calculated using Ci=polymer concentration in the slice i in the polymer peak times the mass of the slice squared, $Mi^2$. All molecular weights are weight average unless otherwise noted. All molecular weights are reported in g/mol unless otherwise noted. This method is the preferred method of measurement and used in the examples and throughout the disclosures unless otherwise specified. See also, for background, Macromolecules, Vol. 34, No. 19, *Effect of Short Chain Branching on the Coil Dimensions of Polyolefins in Dilute Solution*, Sun et al., pg. 6812-6820 (2001).

The broadness of the composition distribution of the polymer may be characterized by $T_{75}$-$T_{25}$. TREF is measured using an analytical size TREF instrument (Polymerchar, Spain), with a column of the following dimensions: inner diameter (ID) 7.8 mm, outer diameter (OD) 9.53 mm, and column length of 150 mm. The column may be filled with steel beads. 0.5 mL of a 4 mg/ml polymer solution in orthodichlorobenzene (ODCB) containing 2 g BHT/4 L were charge onto the column and cooled from 140° C. to −15° C. at a constant cooling rate of 1.0° C./min Subsequently, ODCB may be pumped through the column at a flow rate of 1.0 ml/min, and the column temperature may be increased at a constant heating rate of 2° C./min to elute the polymer. The polymer concentration in the eluted liquid may then be detected by means of measuring the absorption at a wavenumber of 2941 cm⁻¹ using an infrared detector. The concentration of the ethylene-α-olefin copolymer in the eluted liquid may be calculated from the absorption and plotted as a function of temperature. As used herein, $T_{75}$-$T_{25}$ values refer to where $T_{25}$ is the temperature in degrees Celsius at which 25% of the eluted polymer is obtained and $T_{75}$ is the temperature in degrees Celsius at which 75% of the eluted polymer is obtained via a TREF analysis. For example, in an embodiment, the polymer may have a $T_{75}$-$T_{25}$ value from 5 to 10, alternatively, a $T_{75}$-$T_{25}$ value from 5.5 to 10, and alternatively, a $T_{75}$-$T_{25}$ value from 5.5 to 8, alternatively, a $T_{75}$-$T_{25}$ value from 6 to 10, and alternatively, a $T_{75}$-$T_{25}$ value from 6 to 8, where $T_{25}$ is the temperature in degrees Celsius at which 25% of the eluted polymer is obtained and $T_{75}$ is the temperature in degrees Celsius at which 75% of the eluted polymer is obtained via temperature rising elution fractionation (TREF).

Polyethylene Polymer

The polyethylene polymer comprises from 70.0 mole % to or 100.0 mole % of units derived from ethylene. The lower limit on the range of ethylene content may be from 70.0 mole %, 75.0 mole %, 80.0 mole %, 85.0 mole %, 90.0 mole %, 92.0 mole %, 94.0 mole %, 95.0 mole %, 96.0 mole %, 97.0 mole %, 98.0 mole %, or 99.0 mole % based on the mole % of polymer units derived from ethylene. The polyethylene polymer may have an upper ethylene limit of 80.0 mole %, 85.0 mole %, 90.0 mole %, 92.0 mole %, 94.0 mole %, 95.0 mole %, 96.0 mole %, 97.0 mole %, 98.0 mole %, 99.0 mole %, 99.5 mole %, or 100.0 mole %, based on polymer units derived from ethylene. For polyethylene copolymers, the polyethylene polymer may have less than 50.0 mole % of polymer units derived from a $C_3$-$C_{20}$ olefin, preferably, an alpha-olefin, e.g., hexene or octene. The lower limit on the range of $C_3$-$C_{20}$ olefin-content may be 25.0 mole %, 20.0 mole %, 15.0 mole %, 10.0 mole %, 8.0 mole %, 6.0 mole %, 5.0 mole %, 4.0 mole %, 3.0 mole %, 2.0 mole %, 1.0 mole %, or 0.5 mole %, based on polymer units derived from the $C_3$-$C_{20}$ olefin. The upper limit on the range of $C_3$-$C_{20}$ olefin-content may be 20.0 mole %, 15.0 mole %, 10.0 mole %, 8.0 mole %, 6.0 mole %, 5.0 mole %, 4.0 mole %, 3.0 mole %, 2.0 mole %, or 1.0 mole %, based on polymer units derived from the $C_3$ to $C_{20}$ olefin. Any of the lower limits may be combined with any of the upper limits to form a range. Comonomer content is based on the total content of all monomers in the polymer.

In a class of embodiments, the polyethylene polymer may have minimal long chain branching (i.e., less than 1.0 long-chain branch/1000 carbon atoms, preferably particularly 0.05 to 0.50 long-chain branch/1000 carbon atoms). Such values are characteristic of a linear structure that is consistent with a branching index (as defined below) of $g'_{vis} \geq 0.980$, 0.985, $\geq 0.99$, $\geq 0.995$, or 1.0. While such values are indicative of little to no long chain branching, some long chain branches may be present (i.e., less than 1.0 long-chain branch/1000 carbon atoms, preferably less than 0.5 long-chain branch/1000 carbon atoms, particularly 0.05 to 0.50 long-chain branch/1000 carbon atoms).

In some embodiments, the polyethylene polymers may have a density in accordance with ASTM D-4703 and ASTM D-1505/ISO 1183 of from about 0.910 to about 0.925 g/cm$^3$, from about 0.910 to about 0.923 g/cm$^3$, from about 0.910 to about 0.920 g/cm$^3$, from about 0.915 to about 0.921 g/cm$^3$, from about 0.910 to about 0.918 g/cm$^3$, from about 0.912 to about 0.918 g/cm$^3$, or from about 0.912 to about 0.917 g/cm$^3$.

The weight average molecular weight ($M_w$) of the polyethylene polymers may be from about 15,000 to about 500,000 g/mol, from about 20,000 to about 250,000 g/mol, from about 25,000 to about 150,000 g/mol, from about 150,000 to about 400,000 g/mol, from about 200,000 to about 400,000 g/mol, or from about 250,000 to about 350,000 g/mol.

The polyethylene polymers may have a molecular weight distribution (MWD) or ($M_w/M_n$) of from about 1.5 to about 5.0, from about 2.0 to about 4.0, from about 3.0 to about 4.0, or from about 2.5 to about 4.0.

The polyethylene polymers may have a z-average molecular weight ($M_z$) to weight average molecular weight ($M_w$) greater than about 1.5, or greater than about 1.7, or greater than about 2.0. In some embodiments, this ratio is from about 1.7 to about 3.5, from about 2.0 to about 3.0, or from about 2.2 to about 3.0.

The polyethylene polymers may have a melt index (MI) or ($I_{2.16}$) as measured by ASTM D-1238-E (190° C./2.16 kg) of about 0.1 to about 300 g/10 min, about 0.1 to about 100 g/10 min, about 0.1 to about 50 g/10 min, about 0.1 g/10 min to about 5.0 g/10 min, about 0.1 g/10 min to about 3.0 g/10 min, about 0.1 g/10 min to about 2.0 g/10 min, about 0.1 g/10 min to about 1.2 g/10 min, about 0.2 g/10 min to about 1.5 g/10 min, about 0.2 g/10 min to about 1.1 g/10 min, about 0.3 g/10 min to about 1.0 g/10 min, about 0.4 g/10 min to about 1.0 g/10 min, about 0.5 g/10 min to about 1.0 g/10 min, about 0.6 g/10 min to about 1.0 g/10 min, about 0.7 g/10 min to about 1.0 g/10 min, or about 0.75 g/10 min to about 0.95 g/10 min.

The polyethylene polymers may have a melt index ratio (MIR) ($I_{21.6}/I_{2.16}$) (as defined below) of from about 10.0 to about 50.0, from about 15.0 to about 45.0, from about 20.0 to about 40.0, from about 20.0 to about 35.0, from about 22 to about 38, from about 20 to about 32, from about 25 to about 31, or from about 28 to about 30.

In a class of embodiments, the polyethylene polymers may contain less than 5.0 ppm hafnium, less than 2.0 ppm hafnium, less than 1.5 ppm hafnium, or less than 1.0 ppm hafnium. In other embodiments, the polyethylene polymers may contain from about 0.01 ppm to about 2 ppm hafnium, from about 0.01 ppm to about 1.5 ppm hafnium, or from about 0.01 ppm to about 1.0 ppm hafnium.

Typically, the amount of hafnium is greater than the amount of zirconium in the polyethylene polymer. In a particular class of embodiments, the ratio of hafnium to zirconium (ppm/ppm) is at least about 2.0, at least about 10.0, at least about 15, at least about 17.0, at least about 20.0, at least about 25.0, at least about 50.0, at least about 100.0, at least about 200.0, or at least about 500.0 or more. While zirconium generally is present as an impurity in hafnium, it will be realized in some embodiments where particularly pure hafnium-containing catalysts are used, the amount of zirconium may be extremely low, resulting in a virtually undetectable or undetectable amount of zirconium in the polyethylene polymer. Thus, the upper limit on the ratio of hafnium to zirconium in the polymer may be quite large.

In several classes of embodiments, the polyethylene polymers may have at least a first peak and a second peak in a comonomer distribution analysis, wherein the first peak has a maximum at a log($M_w$) value of 4.0 to 5.4, 4.3 to 5.0, or 4.5 to 4.7; and a TREF elution temperature of 70.0° C. to 100.0° C., 80.0° C. to 95.0° C., or 85.0° C. to 90.0° C. The second peak in the comonomer distribution analysis has a maximum at a log($M_w$) value of 5.0 to 6.0, 5.3 to 5.7, or 5.4 to 5.6; and a TREF elution temperature of 40.0° C. to 60.0° C., 45.0° C. to 60.0° C., or 48.0° C. to 54.0° C.

In any of the embodiments described above, the polyethylene polymer may have one or more of the following properties: a melt index (MI) (190° C./2.16 kg) of from about 0.1 g/10 min to about 5.0 g/10 min; a melt index ratio (MIR) of from about 15 to about 30; a $M_w$ of from about 20,000 to about 200,000 g/mol; a $M_w/M_n$ of from about 2.0 to about 4.5; and a density of from about 0.910 to about 0.925 g/cm$^3$. In any of these embodiments, the amount of hafnium is greater than the amount of zirconium and a ratio of hafnium to zirconium (ppm/ppm) may be at least about 2.0, at least about 10.0, at least about 15.0, at least about 17.0, at least about 20.0, or at least about 25.0.

In several of the classes of embodiments described above, the polyethylene polymer may have an orthogonal comonomer distribution. The term "orthogonal comonomer distribution" is used herein to mean across the molecular weight range of the ethylene polymer, comonomer contents for the various polymer fractions are not substantially uniform and a higher molecular weight fraction thereof generally has a higher comonomer content than that of a lower molecular weight fraction. The term "substantially uniform comonomer distribution" is used herein to mean that comonomer content of the polymer fractions across the molecular weight range of the ethylene-based polymer vary by <10.0 wt %. In some embodiments, a substantially uniform comonomer distribution may refer to <8.0 wt %, <5.0 wt %, or <2.0 wt %. Both a substantially uniform and an orthogonal comonomer distribution may be determined using fractionation techniques such as gel permeation chromatography-differential viscometry (GPC-DV), temperature rising elution fraction-differential viscometry (TREF-DV) or cross-fractionation techniques.

Additionally, the melt strength of the polyethylene polymer at a particular temperature may be determined with a Gottfert Rheotens Melt Strength Apparatus. To determine the melt strength, unless otherwise stated, a polymer melt strand extruded from the capillary die is gripped between two counter-rotating wheels on the apparatus. The take-up speed is increased at a constant acceleration of 2.4 mm/sec$^2$. The maximum pulling force (in the unit of cN) achieved before the strand breaks or starts to show draw-resonance is determined as the melt strength. The temperature of the rheometer is set at 190° C. The capillary die has a length of 30 mm and a diameter of 2 mm. The polymer melt is extruded from the die at a speed of 10 mm/sec. The distance between the die exit and the wheel contact point should be 122 mm.

While the ethylene-based polymer compositions useful in the films described herein generally have a CDBI<50.0%, some have a CDBI preferably 20.0% to <50, 0%, or 20.0% to <40.0%, or 20.0% to 35.0%. In another embodiment, the ethylene-based polymer composition has a CDBI of from 35.0% to 45.0% or from 25.0% to 28.0%. Further details of determining the CDBI of a copolymer are known to those skilled in the art. See, for example, WO 93/03093, published Feb. 18, 1993.

The melt strength of the polyethylene polymer may be in the range from about 1 to about 100 cN, about 1 to about 50 cN, about 1 to about 25 cN, about 3 to about 15 cN, about 4 to about 12 cN, or about 5 to about 10 cN.

Materials and processes for making the polyethylene polymer have been described in, for example, U.S. Pat. No. 6,956,088, particularly Example 1; U.S. Patent Application Publication No. 2009/0297810, particularly Example 1; U.S. Patent Application Publication No. 2015/0291748, particularly PE1-PE5 in the Examples; and WO 2014/099356, particularly PE3 referenced on page 12 and in the Examples, including the use of a silica supported hafnium transition metal metallocene/methylalumoxane catalyst system described in, for example, U.S. Pat. Nos. 6,242,545 and 6,248,845, particularly Example 1.

The polyethylene polymer is commercially available from ExxonMobil Chemical Company, Houston, Tex., and sold under Exceed XP™ metallocene polyethylene (mPE). Exceed XP™ mPE offers step-out performance with respect to, for example, dart drop impact strength, flex-crack resistance, and machine direction (MD) tear, as well as maintaining stiffness at lower densities. Exceed XP™ mPE also offers optimized solutions for a good balance of melt strength, toughness, stiffness, and sealing capabilities which makes this family of polymers well-suited for blown film/sheet solutions.

Additional Polymers

Additional polymers may be combined with the polyethylene polymer described above in a blend in a monolayer sheet or in one or more layers in a multilayer sheet or structure. The additional polymers may include other polyolefin polymers such as the following ethylene-based and/or propylene-based polymers.

First Additional Polyethylene Polymer

The first additional polyethylene polymers are ethylene-based polymers having about 99.0 to about 80.0 wt %, 99.0 to 85.0 wt %, 99.0 to 87.5 wt %, 99.0 to 90.0 wt %, 99.0 to 92.5 wt %, 99.0 to 95.0 wt %, or 99.0 to 97.0 wt %, of polymer units derived from ethylene and about 1.0 to about 20.0 wt %, 1.0 to 15.0 wt %, 1.0 to 12.5 wt %, 1.0 to 10.0 wt %, 1.0 to 7.5 wt %, 1.0 to 5.0 wt %, or 1.0 to 3.0 wt % of polymer units derived from one or more $C_3$ to $C_{20}$ α-olefin comonomers, preferably $C_3$ to $C_{10}$ α-olefins, and more preferably $C_4$ to $C_8$ α-olefins. The α-olefin comonomer may be linear, branched, cyclic and/or substituted, and two or more comonomers may be used, if desired. Examples of suitable comonomers include propylene, butene, 1-pentene; 1-pentene with one or more methyl, ethyl, or propyl substituents; 1-hexene; 1-hexene with one or more methyl, ethyl, or propyl substituents; 1-heptene; 1-heptene with one or more methyl, ethyl, or propyl substituents; 1-octene; 1-octene with one or more methyl, ethyl, or propyl substituents; 1-nonene; 1-nonene with one or more methyl, ethyl, or propyl substituents; ethyl, methyl, or dimethyl-substituted 1-decene; 1-dodecene; and styrene. Particularly suitable comonomers include 1-butene, 1-hexene, and 1-octene, 1-hexene, and mixtures thereof.

In an embodiment of the invention, the first additional polyethylene polymer comprises from about 8 wt % to about 15 wt %, of $C_3$-$C_{10}$ α-olefin derived units, and from about 92 wt % to about 85 wt % ethylene derived units, based upon the total weight of the polymer.

In another embodiment of the invention, the first additional polyethylene polymer comprises from about 9 wt % to about 12 wt %, of $C_3$-$C_{10}$ α-olefin derived units, and from about 91 wt % to about 88 wt % ethylene derived units, based upon the total weight of the polymer.

The first additional polyethylene polymers may have a melt index (MI), $I_{2.16}$ or simply $I_2$ for shorthand according to ASTM D1238, condition E (190° C./2.16 kg) reported in grams per 10 minutes (g/10 min), of ≥about 0.10 g/10 min, e.g., ≥about 0.15 g/10 min, ≥about 0.18 g/10 min, ≥about 0.20 g/10 min, ≥about 0.22 g/10 min, ≥about 0.25 g/10 min, ≥about 0.28, or ≥about 0.30 g/10 min. Additionally, the first additional polyethylene polymers may have a melt index $(I_{2.16})$ ≤about 3.0 g/10 min, ≤about 2.0 g/10 min, ≤about 1.5 g/10 min, ≤about 1.0 g/10 min, ≤about 0.75 g/10 min, ≤about 0.50 g/10 min, ≤about 0.40 g/10 min, ≤about 0.30 g/10 min, ≤about 0.25 g/10 min, ≤about 0.22 g/10 min, ≤about 0.20 g/10 min, ≤about 0.18 g/10 min, or ≤about 0.15 g/10 min. Ranges expressly disclosed include, but are not limited to, ranges formed by combinations any of the above-enumerated values, e.g., from about 0.1 to about 3.0, about 0.2 to about 2.0, about 0.2 to about 0.5 g/10 min, etc.

The first additional polyethylene polymers may also have High Load Melt Index (HLMI), $I_{21.6}$ or $I_{21}$ for shorthand, measured in accordance with ASTM D-1238, condition F (190° C./21.6 kg). For a given polymer having an MI and MIR as defined herein, the HLMI is fixed and can be calculated in accordance with the following paragraph.

The first additional polyethylene polymers may have a Melt Index Ratio (MIR) which is a dimensionless number and is the ratio of the high load melt index to the melt index, or $I_{21.6}/I_{2.16}$ as described above. The MIR of the first additional polyethylene polymers may be from 25 to 80, alternatively, from 25 to 60, alternatively, from about 30 to about 55, and alternatively, from about 35 to about 50.

The first additional polyethylene polymers may have a density ≥about 0.905 g/cm$^3$, ≥about 0.910 g/cm$^3$, ≥about 0.912 g/cm$^3$, ≥about 0.913 g/cm$^3$, ≥about 0.915 g/cm$^3$, ≥about 0.916 g/cm$^3$, ≥about 0.917 g/cm$^3$, ≥about 0.918 g/cm$^3$. Additionally or alternatively, first additional polyethylene polymers may have a density ≤about 0.945 g/cm$^3$, e.g., ≤about 0.940 g/cm$^3$, ≤about 0.937 g/cm$^3$, ≤about 0.935 g/cm$^3$, ≤about 0.930 g/cm$^3$, ≤about 0.925 g/cm$^3$, ≤about 0.920 g/cm$^3$, or ≤about 0.918 g/cm$^3$. Ranges expressly disclosed include, but are not limited to, ranges formed by combinations any of the above-enumerated values, e.g., from about 0.905 to about 0.945 g/cm$^3$, 0.910 to about 0.935 g/cm$^3$, 0.912 to 0.930 g/cm$^3$, 0.916 to 0.925 g/cm$^3$, 0.918 to 0.920 g/cm$^3$, etc. Density is determined using chips cut from plaques compression molded in accordance with ASTM D-1928 Procedure C, aged in accordance with ASTM D-618 Procedure A, and measured as specified by ASTM D-1505.

Typically, although not necessarily, the first additional polyethylene polymers may have a molecular weight distribution (MWD, defined as $W_w/M_n$) of about 2.5 to about 5.5, preferably 3.0 to 4.0.

The melt strength may be in the range from about 1 to about 100 cN, about 1 to about 50 cN, about 1 to about 25 cN, about 3 to about 15 cN, about 4 to about 12 cN, or about 5 to about 10 cN.

The first additional polyethylene polymers (or sheets made therefrom) may also be characterized by an averaged 1% secant modulus (M) of from 10,000 to 60,000 psi (pounds per square inch), alternatively, from 20,000 to 40,000 psi, alternatively, from 20,000 to 35,000 psi, alternatively, from 25,000 to 35,000 psi, and alternatively, from 28,000 to 33,000 psi, and a relation between M and the dart drop impact strength in g/mil (DIS) complying with formula (A):

$$DIS \geq 0.8*[100+e^{(11.71-0.000268M+2.183\times10^{-9}M^2)}], \quad (A)$$

where "e" represents 2.7183, the base Napierian logarithm, M is the averaged modulus in psi, and DIS is the 26 inch dart impact strength. The DIS is preferably from about 120 to about 1000 g/mil, even more preferably, from about 150 to about 800 g/mil.

The branching index, g' is inversely proportional to the amount of branching. Thus, lower values for g' indicate relatively higher amounts of branching. The amounts of short and long-chain branching each contribute to the branching index according to the formula: $g'=g'_{LCB} \times g'_{SCB}$.

Typically, the first additional polyethylene polymers have a g'vis of 0.85 to 0.99, particularly, 0.87 to 0.97, 0.89 to 0.97, 0.91 to 0.97, 0.93 to 0.95, or 0.97 to 0.99.

The first additional polyethylene polymers may be made by any suitable polymerization method including solution polymerization, slurry polymerization, supercritical, and gas phase polymerization using supported or unsupported catalyst systems, such as a system incorporating a metallocene catalyst.

As used herein, the term "metallocene catalyst" is defined to comprise at least one transition metal compound containing one or more substituted or unsubstituted cyclopentadienyl moiety (Cp) (typically two Cp moieties) in combination with a Group 4, 5, or 6 transition metal, such as, zirconium, hafnium, and titanium.

Metallocene catalysts generally require activation with a suitable co-catalyst, or activator, in order to yield an "active metallocene catalyst", i.e., an organometallic complex with a vacant coordination site that can coordinate, insert, and polymerize olefins. Active catalyst systems generally include not only the metallocene complex, but also an activator, such as an alumoxane or a derivative thereof (preferably methyl alumoxane), an ionizing activator, a Lewis acid, or a combination thereof. Alkylalumoxanes (typically methyl alumoxane and modified methylalumoxanes) are particularly suitable as catalyst activators. The catalyst system may be supported on a carrier, typically an inorganic oxide or chloride or a resinous material such as, for example, polyethylene or silica.

Zirconium transition metal metallocene-type catalyst systems are particularly suitable. Non-limiting examples of metallocene catalysts and catalyst systems useful in practicing the present invention include those described in, U.S. Pat. Nos. 5,466,649, 6,476,171, 6,225,426, and 7,951,873, and in the references cited therein, all of which are fully incorporated herein by reference. Particularly useful catalyst systems include supported dimethylsilyl bis(tetrahydroindenyl) zirconium dichloride.

Supported polymerization catalyst may be deposited on, bonded to, contacted with, or incorporated within, adsorbed or absorbed in, or on, a support or carrier. In another embodiment, the metallocene is introduced onto a support by slurrying a presupported activator in oil, a hydrocarbon such as pentane, solvent, or non-solvent, then adding the metallocene as a solid while stirring. The metallocene may be finely divided solids. Although the metallocene is typically of very low solubility in the diluting medium, it is found to distribute onto the support and be active for polymerization. Very low solubilizing media such as mineral oil (e.g., Kaydo™ or Drakol™) or pentane may be used. The diluent can be filtered off and the remaining solid shows polymerization capability much as would be expected if the catalyst had been prepared by traditional methods such as contacting the catalyst with methylalumoxane in toluene, contacting with the support, followed by removal of the solvent. If the diluent is volatile, such as pentane, it may be removed under vacuum or by nitrogen purge to afford an active catalyst. The mixing time may be greater than 4 hours, but shorter times are suitable.

Typically in a gas phase polymerization process, a continuous cycle is employed where in one part of the cycle of a reactor, a cycling gas stream, otherwise known as a recycle stream or fluidizing medium, is heated in the reactor by the heat of polymerization. This heat is removed in another part of the cycle by a cooling system external to the reactor. (See e.g., U.S. Pat. Nos. 4,543,399, 4,588,790, 5,028,670, 5,317, 036, 5,352,749, 5,405,922, 5,436,304, 5,453,471, 5,462,999, 5,616,661, and 5,668,228.) To obtain the first additional polyethylene polymers, individual flow rates of ethylene, comonomer, and hydrogen should be controlled and adjusted to obtain the desired polymer properties.

Suitable commercial polymers for the first additional polyethylene polymer are available from ExxonMobil Chemical Company as Enable™ metallocene polyethylene (mPE) resins.

Second Additional Polyethylene Polymer

The second additional polyethylene polymers are ethylene-based polymers comprising ≥50.0 wt % of polymer units derived from ethylene and ≤50.0 wt % preferably 1.0 wt % to 35.0 wt %, even more preferably 1 to 6 wt % of polymer units derived from a $C_3$ to $C_{20}$ alpha-olefin comonomer (for example, hexene or octene).

The second additional polyethylene polymer may have a density of ≥about 0.910 g/cm$^3$, ≥about 0.915 g/cm$^3$, ≥about 0.920 g/cm$^3$, ≥about 0.925 g/cm$^3$, ≥about 0.930 g/cm$^3$, or ≥about 0.940 g/cm$^3$. Alternatively, the second polyethylene polymer may have a density of ≤about 0.950 g/cm$^3$, e.g., ≤about 0.940 g/cm$^3$, ≤about 0.930 g/cm$^3$, ≤about 0.925 g/cm$^3$, ≤about 0.920 g/cm$^3$, or ≤about 0.915 g/cm$^3$. Ranges expressly disclosed include ranges formed by combinations any of the above-enumerated values, e.g., 0.910 to 0.950 g/cm$^3$, 0.910 to 0.930 g/cm$^3$, 0.910 to 0.925 g/cm$^3$, etc. Density is determined using chips cut from plaques compression molded in accordance with ASTM D-1928 Procedure C, aged in accordance with ASTM D-618 Procedure A, and measured as specified by ASTM D-1505.

The second additional polyethylene polymer may have a melt index ($I_{2.16}$) according to ASTM D1238 (190° C./2.16 kg) of ≥about 0.5 g/10 min., e.g., ≥about 0.5 g/10 min., ≥about 0.7 g/10 min., ≥about 0.9 g/10 min., ≥about 1.1 g/10 min., ≥about 1.3 g/10 min., ≥about 1.5 g/10 min., or ≥about 1.8 g/10 min. Alternatively, the melt index ($I_{2.16}$) may be ≤about 8.0 g/10 min., ≤about 7.5 g/10 min., ≤about 5.0 g/10 min., ≤about 4.5 g/10 min., ≤about 3.5 g/10 min., ≤about 3.0 g/10 min., ≤about 2.0 g/10 min., e.g., ≤about 1.8 g/10 min., ≤about 1.5 g/10 min., ≤about 1.3 g/10 min., ≤about 1.1 g/10 min., ≤about 0.9 g/10 min., or ≤about 0.7 g/10 min., 0.5 to 2.0 g/10 min., particularly 0.75 to 1.5 g/10 min. Ranges expressly disclosed include ranges formed by combinations any of the above-enumerated values, e.g., about 0.5 to about 8.0 g/10 min., about 0.7 to about 1.8 g/10 min., about 0.9 to about 1.5 g/10 min., about 0.9 to 1.3, about 0.9 to 1.1 g/10 min, about 1.0 g/10 min., etc.

In particular embodiments, the second additional polyethylene polymer may have a density of 0.910 to 0.920 g/cm$^3$, a melt index ($I_{2.16}$) of 0.5 to 8.0 g/10 min., and a CDBI of 60.0% to 80.0%, preferably between 65% and 80%.

The second polyethylene polymers are generally considered linear. Suitable second additional polyethylene polymers are available from ExxonMobil Chemical Company under the trade name Exceed™ metallocene (mPE) resins. The MIR for Exceed materials will typically be from about 15 to about 20.

Third Additional Polyethylene Polymer

The third additional polyethylene polymers may be a copolymer of ethylene, and one or more polar comonomers or $C_3$ to $C_{10}$ α-olefins. Typically, the third additional polyethylene polymer includes 99.0 wt % to about 80.0 wt %, 99.0 wt % to 85.0 wt %, 99.0 wt % to 87.5 wt %, 95.0 wt % to 90.0 wt %, of polymer units derived from ethylene and about 1.0 to about 20.0 wt %, 1.0 wt % to 15.0 wt %, 1.0 wt % to 12.5 wt %, or 5.0 wt % to 10.0 wt % of polymer units derived from one or more polar comonomers, based upon the total weight of the polymer. Suitable polar comonomers include, but are not limited to: vinyl ethers such as vinyl methyl ether, vinyl n-butyl ether, vinyl phenyl ether, vinyl beta-hydroxy-ethyl ether, and vinyl dimethylamino-ethyl ether; olefins such as propylene, butene-1, cis-butene-2, trans-butene-2, isobutylene, 3,3,-dimethylbutene-1, 4-methylpentene-1, octene-1, and styrene; vinyl type esters such as vinyl acetate, vinyl butyrate, vinyl pivalate, and vinylene carbonate; haloolefins such as vinyl fluoride, vinylidene fluoride, tetrafluoroethylene, vinyl chloride, vinylidene chloride, tetrachloroethylene, and chlorotrifluoroethylene; acrylic-type esters such as methyl acrylate, ethyl acrylate, n-butyl acrylate, t-butyl acrylate, 2-ethylhexyl acrylate, alpha-cyanoisopropyl acrylate, beta-cyanoethyl acrylate, o-(3-phenylpropan-1,3,-dionyl)phenyl acrylate, methyl methacrylate, n-butyl methacrylate, t-butyl methacrylate, cyclohexyl methacrylate, 2-ethylhexyl methacrylate, methyl methacrylate, glycidyl methacrylate, beta-hydroxethyl methacrylate, beta-hydroxpropyl methacrylate, 3-hydroxy-4-carbo-methoxy-phenyl methacrylate, N,N-dimethylaminoethyl methacrylate, t-butylaminoethyl methacrylate, 2-(1-aziridinyl)ethyl methacrylate, diethyl fumarate, diethyl maleate, and methyl crotonate; other acrylic-type derivatives such as acrylic acid, methacrylic acid, crotonic acid, maleic acid, methyl hydroxy maleate, itaconic acid, acrylonitrile, fumaronitrile, N,N-dimethylacrylamide, N-isopropylacrylamide, N-t-butylacrylamide, N-phenylacrylamide, diacetone acrylamide, methacrylamide, N-phenylmethacrylamide, N-ethylmaleimide, and maleic anhydride; and other compounds such as allyl alcohol, vinyltrimethylsilane, vinyltriethoxysilane, N-vinylcarbazole, N-vinyl-N-methyl-acetamide, vinyldibutylphosphine oxide, vinyldiphenylphosphine oxide, bis-(2-chloroethyl) vinylphosphonate, and vinyl methyl sulfide.

In some embodiments, the third additional polyethylene polymer is an ethylene/vinyl acetate copolymer having about 2.0 wt % to about 15.0 wt %, typically about 5.0 wt % to about 10.0 wt %, polymer units derived from vinyl acetate, based on the amounts of polymer units derived from ethylene and vinyl acetate (EVA). In certain embodiments, the EVA resin can further include polymer units derived from one or more comonomer units selected from propylene, butene, 1-hexene, 1-octene, and/or one or more dienes.

Suitable dienes include, for example, 1,4-hexadiene, 1,6-octadiene, 5-methyl-1,4-hexadiene, 3,7-dimethyl-1,6-octadiene, dicyclopentadiene (DCPD), ethylidene norbornene (ENB), norbornadiene, 5-vinyl-2-norbornene (VNB), and combinations thereof.

Suitable third additional polyethylene polymers include Escorene™ Ultra EVA resins, Escor™ EAA resins, ExxonMobil™ EnBA resins, and Optema™ EMA resins available from ExxonMobil Chemical Company, Houston, Tex.

Fourth Additional Polyethylene Polymer

The fourth additional polyethylene polymers are generally heterogeneously branched ethylene polymers. The term "heterogeneously branched ethylene polymer" refers to an polymer having polymer units derived from ethylene and preferably at least one $C_3$-$C_{20}$ alpha-olefin and having a CDBI <50.0%. Typically, such polymers are the result of a Ziegler-Natta polymerization process. Such polymers are also referred to as Linear Low Density Polyethylene Polymers or LLDPEs, more particularly sometimes as ZN LLDPEs.

Heterogeneously branched ethylene polymers differ from the homogeneously branched ethylene polymers primarily in their branching distribution. For example, heterogeneously branched LLDPE polymers have a distribution of branching, including a highly branched portion (similar to a very low density polyethylene), a medium branched portion (similar to a medium branched polyethylene) and an essentially linear portion (similar to linear homopolymer polyethylene). The amount of each of these fractions varies depending upon the whole polymer properties desired. For example, a linear homopolymer polyethylene polymer has neither branched nor highly branched fractions, but is linear.

Heterogeneously branched ethylene polymer polymers typically have a CDBI <50.0%, preferably <45.0%, <40.0%, <35.0%, <30.0%, <25.0%, or <20.0%. In particular embodiments the CDBI of the heterogeneously branched ethylene polymer is 20.0 to <50.0%, 20.0 to 45.0%, 20.0 to 35.0%, 20.0 to 30.0%, 20.0 to 25.0%, 25.0 to 30.0%, 25.0 to 35.0%, 25.0 to 40.0%, 25.0 to 45.0%, 30.0 to 35.0%, 30.0 to 40.0%, 30.0 to 45.0%, 30.0 to <50.0%, 35.0 to 40.0%, 35.0 to <50.0%, 40.0 to 45.0%, or 40.0 to <50.0%.

The heterogeneously branched ethylene polymer typically comprises 80 to 100 mole % of polymer units derived from ethylene and 0 to 20.0 mole % of polymer units derived from at least one $C_3$ to $C_{20}$ alpha-olefin, preferably the alpha olefin has 4 to 8 carbon atoms. The content of comonomer is determined based on the mole fraction based on the content of all monomers in the polymer.

The content of polymer units derived from alpha-olefin in the heterogeneously branched ethylene polymer may be any amount consistent with the above ranges for ethylene. Some preferred amounts are 2.0 to 20.0 mole %, 2.0 to 15.0 mole %, or 5.0 to 10.0 mole %, particularly where the polymer units are derived from one or more $C_4$-$C_8$ alpha-olefins, more particularly butene-1, hexene-1, or octene-1.

Heterogeneously branched ethylene polymers may have a density ≤0.950 g/cm³, preferably ≤0.940 g/cm³, particularly from 0.915 to about 0.950 g/cm³, preferably 0.920 to 0.940 g/cm³.

The melt index, $I_{2.16}$, according to ASTM D-1238-E (190° C./2.16 kg) of the heterogeneously branched ethylene polymer is generally from about 0.1 g/10 min. to about 100.0 g/10 min.

Suitable heterogeneously branched ethylene polymers and other polyethylene polymers include ExxonMobil™ Linear Low Density Polyethylene (LLDPE) and ExxonMobil™ NTX Super hexene copolymer available from ExxonMobil Chemical Company, Houston, Tex.

A fifth additional polyethylene polymer may also be present as High Density Polyethylene (HDPE). The HDPE may be unimodal or bimodal/multimodal and have a narrow molecular weight distribution (MWD) or broad MWD.

A sixth additional polyethylene polymer may also be present as Low Density Polyethylene made from a High Pressure Polymerization Process. Suitable resins include Nexxstar™ resins available from ExxonMobil and other LDPE's.

Propylene-Based Polymer

Propylene-based polymers are also contemplated. A suitable propylene-based polymer or elastomer ("PBE") comprises propylene and from about 5 wt % to about 25 wt % of one or more comonomers selected from ethylene and/or $C_4$-$C_{12}$ α-olefins. In one or more embodiments, the α-olefin comonomer units may be derived from ethylene, butene, pentene, hexene, 4-methyl-1-pentene, octene, or decene. The embodiments described below are discussed with reference to ethylene as the α-olefin comonomer, but the embodiments are equally applicable to other copolymers with other α-olefin comonomers. In this regard, the copolymers may simply be referred to as propylene-based polymers with reference to ethylene as the α-olefin.

In one or more embodiments, the PBE may include at least about 2 wt %, at least about 3 wt %, at least about 4 wt %, at least about 5 wt %, at least about 6 wt %, at least about 7 wt %, or at least about 8 wt %, or at least about 9 wt %, or at least about 10 wt %, or at least about 12 wt % ethylene-derived units. In those or other embodiments, the PBE may include up to about 30 wt %, or up to about 25 wt %, or up to about 22 wt %, or up to about 20 wt %, or up to about 19 wt %, or up to about 18 wt %, or up to about 17 wt % ethylene-derived units, where the percentage by weight is based upon the total weight of the propylene-derived and α-olefin derived units. Stated another way, the PBE may include at least about 70 wt %, or at least about 75 wt %, or at least about 80 wt %, or at least about 81 wt % propylene-derived units, or at least about 82 wt % propylene-derived units, or at least about 83 wt % propylene-derived units; and in these or other embodiments, the PBE may include up to about 95 wt %, or up to about 94 wt %, or up to about 93 wt %, or up to about 92 wt %, or up to about 90 wt %, or up to about 88 wt % propylene-derived units, where the percentage by weight is based upon the total weight of the propylene-derived and α-olefin derived units. In certain embodiments, the PBE may comprise from about 5 wt % to about 25 wt % ethylene-derived units, or from about 9 wt % to about 18 wt % ethylene-derived units.

The PBEs of one or more embodiments are characterized by a melting point (Tm), which can be determined by differential scanning calorimetry (DSC). For purposes herein, the maximum of the highest temperature peak is considered to be the melting point of the polymer. A "peak" in this context is defined as a change in the general slope of the DSC curve (heat flow versus temperature) from positive to negative, forming a maximum without a shift in the baseline where the DSC curve is plotted so that an endothermic reaction would be shown with a positive peak.

In one or more embodiments, the Tm of the PBE (as determined by DSC) is less than about 115° C., or less than about 110° C., or less than about 100° C., or less than about 95° C., or less than about 90° C.

In one or more embodiments, the PBE may be characterized by its heat of fusion (Hf), as determined by DSC. In one or more embodiments, the PBE may have an Hf that is at least about 0.5 J/g, or at least about 1.0 J/g, or at least about 1.5 J/g, or at least about 3.0 J/g, or at least about 4.0 J/g, or at least about 5.0 J/g, or at least about 6.0 J/g, or at least about 7.0 J/g. In these or other embodiments, the PBE may be characterized by an Hf of less than about 75 J/g, or less than about 70 J/g, or less than about 60 J/g, or less than about 50 J/g, or less than about 45 J/g, or less than about 40 J/g, or less than about 35 J/g, or less than about 30 J/g.

As used within this specification, DSC procedures for determining Tm and Hf include the following. The polymer is pressed at a temperature of from about 200° C. to about 230° C. in a heated press, and the resulting polymer sheet is hung, at about 23° C., in the air to cool. About 6 to 10 mg of the polymer sheet is removed with a punch die. This 6 to 10 mg sample is annealed at about 23° C. for about 80 to 100 hours. At the end of this period, the sample is placed in a DSC (Perkin Elmer Pyris One Thermal Analysis System) and cooled at a rate of about 10° C./min to about −50° C. to about −70° C. The sample is heated at a rate of about 10° C./min to attain a final temperature of about 200° C. The sample is kept at 200° C. for 5 minutes and a second cool-heat cycle is performed. Events from both cycles are recorded. The thermal output is recorded as the area under the melting peak of the sample, which typically occurs between about 0° C. and about 200° C. It is measured in Joules and is a measure of the Hf of the polymer.

The PBE can have a triad tacticity of three propylene units, as measured by 13 C NMR, of 75% or greater, 80% or greater, 85% or greater, 90% or greater, 92% or greater, 95% or greater, or 97% or greater. In one or more embodiments, the triad tacticity may range from about 75 to about 99%, or from about 80 to about 99%, or from about 85 to about 99%, or from about 90 to about 99%, or from about 90 to about 97%, or from about 80 to about 97%. Triad tacticity is determined by the methods described in U.S. Pat. No. 7,232,871.

The PBE may have a tacticity index ranging from a lower limit of 4 or 6 to an upper limit of 8 or 10 or 12. The tacticity index, expressed herein as "m/r", is determined by $^{13}$C nuclear magnetic resonance ("NMR"). The tacticity index, m/r, is calculated as defined by H. N. Cheng in 17 MACROMOLECULES 1950 (1984). The designation "m" or "r" describes the stereochemistry of pairs of contiguous propylene groups, "m" referring to meso and "r" to racemic. An m/r ratio of 1.0 generally describes a syndiotactic polymer, and an m/r ratio of 2.0 an atactic material. An isotactic material theoretically may have a ratio approaching infinity, and many by-product atactic polymers have sufficient isotactic content to result in ratios of greater than 50.

In one or more embodiments, the PBE may have a % crystallinity of from about 0.5% to about 40%, or from about 1% to about 30%, or from about 5% to about 25%, determined according to DSC procedures. Crystallinity may be determined by dividing the Hf of a sample by the Hf of a 100% crystalline polymer, which is assumed to be 189 joules/gram for isotactic polypropylene or 350 joules/gram for polyethylene.

In one or more embodiments, the PBE may have a density of from about 0.85 g/cm$^3$ to about 0.92 g/cm$^3$, or from about 0.86 g/cm$^3$ to about 0.90 g/cm$^3$, or from about 0.86 g/cm$^3$ to about 0.89 g/cm$^3$ at room temperature, as measured per the ASTM D-792.

In one or more embodiments, the PBE can have a melt index (MI) (ASTM D-1238-E, 2.16 kg @ 190° C.), of less than or equal to about 100 g/10 min, or less than or equal to about 50 g/10 min, or less than or equal to about 25 g/10 min, or less than or equal to about 10 g/10 min, or less than or equal to about 9.0 g/10 min, or less than or equal to about 8.0 g/10 min, or less than or equal to about 7.0 g/10 min.

In one or more embodiments, the PBE may have a melt flow rate (MFR), as measured according to ASTM D-1238-E (2.16 kg weight @ 230° C.), greater than about 1 g/10 min, or greater than about 2 g/10 min, or greater than about 5 g/10 min, or greater than about 8 g/10 min, or greater than about 10 g/10 min. In the same or other embodiments, the PBE may have an MFR less than about 500 g/10 min, or less than about 400 g/10 min, or less than about 300 g/10 min, or less than about 200 g/10 min, or less than about 100 g/10 min, or less than about 75 g/10 min, or less than about 50 g/10 min. In certain embodiments, the PBE may have an MFR from about 1 to about 100 g/10 min, or from about 2 to about 75 g/10 min, or from about 5 to about 50 g/10 min.

Suitable commercially available propylene-based polymers include Vistamaxx™ Performance Polymers from ExxonMobil Chemical Company and Versify™ Polymers from The Dow Chemical Company, Midland, Mich.

The propylene-based polymers may also include polypropylene homopolymers and/or other polypropylene copolymers. For these types of polymers, the term propylene-based polymer refers to a homopolymer, copolymer, or impact copolymer including >50.0 mol % of polymer units derived from propylene. Some useful propylene-based polymers include those having one or more of the following properties:

1) propylene content of at least 85 wt. % (preferably at least 90 wt. %, preferably at least 95 wt. %, preferably at least 97 wt. %, preferably 100 wt. %);
2) $M_w$ of 30 to 2,000 kg/mol (preferably 50 to 1,000 kg/mol, preferably 90 to 500 kg/mol);
3) $M_w/M_n$ of 1 to 40 (preferably 1.4 to 20, preferably 1.6 to 10, preferably 1.8 to 3.5, preferably 1.8 to 2.5);
4) branching index (g') of 0.2 to 2.0 (preferably 0.5 to 1.5, preferably 0.7 to 1.3, preferably 0.9 to 1.1);
5) melt flow rate (MFR) of 1 to 300 dg/min (preferably 5 to 150 dg/min, preferably 10 to 100 dg/min, preferably 20 to 60 dg/min);
6) melting point of at least 100° C. (preferably at least 110° C., preferably at least 120° C., preferably at least 130° C., preferably at least 140° C., preferably at least 150° C., preferably at least 160° C., preferably at least 165° C.);
7) crystallization temperature ($T_c$, peak) of at least 70° C. (preferably at least 90° C., preferably at least 110° C., preferably at least 130° C.);
8) heat of fusion ($H_f$) of 40 to 160 J/g (preferably 50 to 140 J/g, preferably 60 to 120 J/g, preferably 80 to 100 J/g);
9) crystallinity of 5 to 80% (preferably 10 to 75%, preferably 20 to 70%, preferably 30 to 65%, preferably 40 to 60%);
10) propylene meso diads of 90% or more (preferably 92% or more, preferably 94% or more, preferably 96% or more);
11) heat deflection temperature (HDT) of 45 to 140° C. (preferably 60 to 135° C., preferably 75 to 125° C.);
12) Gardner impact strength at 23° C. of 30 to 1300 J (preferably 40 to 800 J, preferably 50 to 600 J); and/or
13) flexural modulus of 300 to 3000 MPa (preferably 600 to 2500 MPa, preferably 800 to 2000 MPa, preferably 1000 to 1500 MPa).

In a class of embodiments, the propylene-based polymer is selected from polypropylene homopolymers, polypropylene copolymers, and blends or mixtures thereof. The homopolymer may be atactic polypropylene, isotactic polypropylene, highly isotactic polypropylene, syndiotactic polypropylene, and blends or mixtures thereof. The copolymer may be a random copolymer, a statistical copolymer, a block copolymer, and blends or mixtures thereof.

The method of making the propylene-based polymers is not critical, as they may be made by slurry, solution, gas-phase, high-pressure, or other suitable processes, through the use of catalyst systems appropriate for the polymerization of polyolefins, such as Ziegler-Natta-type catalysts, metallocene-type catalysts, other appropriate catalyst systems, or combinations thereof.

In a preferred embodiment the propylene-based polymers are made by the catalysts, activators and processes described in U.S. Pat. Nos. 6,342,566, 6,384,142, WO 03/040201, WO 97/19991 and U.S. Pat. No. 5,741,563. Such catalysts are well known in the art, and are described in, for example, ZIEGLER CATALYSTS (Gerhard Fink, Rolf Mülhaupt and Hans H. Brintzinger, eds., Springer-Verlag 1995); Resconi et al., *Selectivity in Propene Polymerization with Metallocene Catalysts*, 100 CHEM. REV., pp. 1253-1345 (2000); and I, II METALLOCENE-BASED POLYOLEFINS (Wiley & Sons, 2000).

Suitable propylene-based polymers include Achieve™ resins, ExxonMobil™ Polypropylene resins, and Exxtral™ Performance Polyolefins available from ExxonMobil Chemical Company, Houston, Tex.

Polymer Blends

The sheets may include monolayer sheets made from blends of the polymers described above or multilayer sheets of two or more layers comprising a "neat" polymer or a blend of the polymers described above, optionally, blended with other polymers, additives, processing aids etc.

For example, in a class of embodiments, the sheet may comprise two or more layers. The two or more layers may comprise at least one skin layer, a core layer, and optionally, one or more intermediary layers. Each layer may comprise a "neat" polymer with optional processing aids and/or additives or may comprise a blend of polymers with optional processing aids and/or additives.

The at least one of the skin layer, the core layer, or optional intermediary layer may comprise from 1 wt % to 100 wt %, from 30 wt % to 100 wt %, from 40 wt % to 100 wt %, from 50 wt % to 100 wt %, from 60 wt % to 100 wt %, from 65 wt % to 100 wt %, from 70 wt % to 100 wt %, from 75 wt % to 100 wt %, from 85 wt % to 100 wt %, or from 90 wt % to 100 wt %, of the polyethylene polymer, based upon the total weight of the respective skin layer, the core layer, or optional intermediary layer.

In a class of embodiments, the at least one of the skin layer, the core layer, or optional intermediary layer, may further comprise, for example, in a blend, at least one different polyethylene polymer and/or a polypropylene polymer. In some embodiments, the at least one different polyethylene polymer is a linear low density polyethylene polymer.

Additives

The polymers and compositions described above may be used in combination with the following additives and other components.

First Antioxidant

The first antioxidant comprises one or more antioxidants. They include, but are not limited to, hindered phenols, for example, octadecyl-3-(3,5-di-tert.butyl-4-hydroxyphenyl)-propionate (CAS 002082-79-3) commercially available as IRGANOX™ 1076, pentaerythritol tetrakis (3-(3,5-di-tert-butyl-4-hydroxyphenyl)propionate) (CAS 6683-19-8) commercially available as IRGANOX™ 1010; and combinations thereof.

They may be combined with one or more polymers in range from 100 to 4000 parts by weight of the first antioxidant, based on one million parts of the polymer or polymer composition; alternatively, from 250 to 3000 parts by weight of the first antioxidant, based on one million parts of the polymer or polymer composition, alternatively, from 500 to 2500 parts by weight of the first antioxidant, based on one million parts of the polymer or polymer composition, alternatively, from 750 to 2500 parts by weight of the first antioxidant, based on one million parts of the polymer or polymer composition, alternatively, from 750 to 2000 parts by weight of the first antioxidant, based on one million parts of the polymer or polymer composition, and alternatively, from 1000 to 2000 parts by weight of the first antioxidant, based on one million parts of the polymer or polymer composition.

Second Antioxidant

The second antioxidant comprises one or more antioxidants. They include, but are not limited to, liquid phosphites, such as $C_2$-$C_7$, preferably $C_2$-$C_4$, and alkyl aryl phosphites mixed structures. Non-limiting examples include mono-amylphenyl phosphites, di-amylphenyl phosphites, dimethylpropyl phosphites, 2-methylbutanyl phosphites, and combinations thereof. In several embodiments of the invention, the second antioxidant may also be represented by the formula [4-(2-methylbutan-2-yl)phenyl]$_x$[2,4-bis(2-methylbutan-2-yl)phenyl]$_{3-x}$ phosphate, wherein x=0, 1, 2, 3, or combinations thereof.

Such antioxidants and their use with polyolefin polymers have been described in U.S. Patent Application Nos. 2005/0113494, 2007/0021537, 2009/0326112, 2013/0190434, 2013/225738, 2014/0045981 and U.S. Pat. Nos. 5,254,709, 6,444,836, 7,888,414, 7,947,769, 8,008,383, 8,048,946, 8,188,170, and 8,258,214. An example of a commercially available liquid phosphite is sold under the tradename WESTON™ 705 (Addivant, Danbury, Conn.).

The second antioxidant may be combined with one or more polymers in the range from 100 to 4000 parts by weight of the second antioxidant, based on one million parts of the polymer or polymer composition; alternatively, from 250 to 3000 parts by weight of the second antioxidant, based on one million parts of the polymer or polymer composition, alternatively, from 300 to 2000 parts by weight of the second antioxidant, based on one million parts of the polymer or polymer composition, alternatively, from 400 to 1450 parts by weight of the second antioxidant, based on one million parts of the polymer or polymer composition, alternatively, from 425 to 1650 parts by weight of the second antioxidant, based on one million parts of the polymer or polymer composition, and alternatively, from 1 to 450 parts by weight of the second antioxidant, based on one million parts of the polymer or polymer composition.

The polymers and/or compositions comprising the first antioxidant and/or the second antioxidant described above may be used in combination with the following neutralizing agents, additional additives and other components.

Neutralizing Agents

One or more neutralizing agents (also called catalyst deactivators) include, but are not limited to, calcium stearate, zinc stearate, calcium oxide, synthetic hydrotalcite, such as DHT4A, and combinations thereof.

Additional Additives and Other Components

Additional additives and other components include, but are limited to, fillers (especially, silica, glass fibers, talc, etc.) colorants or dyes, pigments, color enhancers, whitening agents, cavitation agents, anti-slip agents, lubricants, plasticizers, processing aids, antistatic agents, antifogging agents, nucleating agents, stabilizers, mold release agents, and other antioxidants (for example, hindered amines and phosphates). Nucleating agents include, for example, sodium benzoate and talc. Slip agents include, for example, oleamide and erucamide.

End Use Applications

Any of the polymers and compositions in combination with the additives and other components described herein may be used in a variety of end-use applications. Such end uses may be produced by methods known in the art. Exemplary end-use applications include but are not limited to sheets. As used herein, "sheet" refers to a film having a thickness of at least 5 mil or more, monolayer or multilayer, made from at least in-part from one or more polyolefin resins. One or more sheets may be used as a liner. As used herein, "liner" refers to a retarder and/or barrier to prevent or slow the transmission of a fluid, gas (e.g., radon, etc.), vapor, microorganism (e.g., mold, fungi, termites, etc.) and/or other contaminant into a structure that is in contact or proximal to typically the ground or other substrate. For example, since concrete is porous, it fails to prevent the transmission of gaseous contaminants into a structure on its own. Thus, liners, sometimes referred to as geomembranes, are used in the construction of buildings to prevent the transmission of water vapor and other contaminants from entering into the building through a concrete foundation that is in contact with the ground. Geomembranes used for preventing vapor transmission through a concrete foundation are often referred to as vapor barriers or vapor retarders. They are commonly employed in heavy duty applications such as industrial and construction liners. See, for example, U.S. Pat. Nos. 3,000,276, 6,182,412, 6,524,029, and 9,085,899. Liners are also employed for landfills, greenhouses, and water-related areas such as aqueducts, canals, pools, reservoirs, lakes, ponds, etc. and wherever a barrier or retarder would find utility.

Sheets may be prepared by any conventional technique known to those skilled in the art, such as for example, techniques utilized to prepare blown, extruded/coextruded, and/or cast films.

The sheets may have at least two, at least three, or at least four layers. In one embodiment the multilayer sheets are composed of three to ten layers. With reference to multilayer sheet structures, the sheets may comprise the same or different layers. The following notation may be used for illustration. Each layer of a sheet is denoted "A" or "B". Where a sheet includes more than one A layer or more than one B layer, one or more prime symbols (', ", '", etc.) are appended to the A or B symbol to indicate layers of the same type that can be the same or can differ in one or more properties, such as chemical composition, density, melt index, thickness, etc. Finally, the symbols for adjacent layers are separated by a slash (/). Using this notation, a three-layer sheet having an inner layer of the polyethylene resin or blend between two outer layers would be denoted A/B/A'. Similarly, a five-layer sheet of alternating layers would be denoted A/B/A'/B'/A". Unless otherwise indicated, the left-to-right or right-to-left order of layers does not matter, nor does the order of prime symbols; e.g., an A/B sheet is equivalent to a B/A sheet, and an A/A'/B/A" sheet is equivalent to an A/B/A'/A" sheet.

The sheets may be tailored to specific applications by adjusting the thickness, materials and order of the various layers, as well as the additives and other components in each layer. The total thickness of a monolayer or multilayer sheets may vary based upon the application desired. A total sheet thickness of from about 5.0 mil to more than 30.0 mil is suitable for many applications. Alternative embodiments include from about 5.0 mil to about 100.0 mil, from about 5.0 mil to about 80.0 mil, from about 10.0 mil to about 60.0 mil, or from about 10.0 mil to about 40.0 mil.

In another class of embodiments, the sheet may have a sheet thickness of ≥5 mil, a sheet thickness of ≥7 mil, a sheet thickness ≥10 mil, a sheet thickness of ≥15 mil, a sheet thickness of ≥20 mil, a sheet thickness ≥30 mil, a sheet thickness of ≥40 mil, or a sheet thickness of ≥50 mil. Those skilled in the art will appreciate that the thickness of individual layers may be adjusted based on the desired end use application and performance, resin(s) employed, equipment capability, desired output and operability constraints, and other factors.

In any of the embodiments described herein, the sheet may be measured for flex crack resistance. Flex crack resistance may be measured using the Gelbo flex test method.

The Gelbo flex test method and flex crack utilizes a Gelbo Flex Tester, model 5000, available from United States Testing Company, Inc. The Gelbo Flex Tester consists of a 3.5 inch diameter stationary head, and a 3.5 inch diameter movable head, spaced at a distance of 7 inch, face to face. The shoulders (0.5 inch wide) on each head, are used to fix the test specimen. The motion of the movable head is controlled by a grooved, reciprocating shaft. The stroke of the shaft is adjustable from 6 inch to 3.5 inch, to accommodate the testing of the materials. The flexing speed is 40 cycles per minute and a full cycle consists of one forward stroke and one return stroke. The grooved shaft is so designed that by requiring the 6 inch movement stroke, one obtains a twisting motion of 440° during the first 3.5 inch travel, followed by a straight horizontal 2.5 inch travel.

The Gelbo flex test method is performed at about 21° C. The test begins with cutting a sheet sample at the following dimensions: length=22 cm (sheet transverse direction) and width=30 cm (sheet machine direction). The handwheel on the motor shaft is turned to bring the circular heads to their maximum opened positions. The sheet sample is installed and the clamps are closed. The sliding door is closed and the counter is then set to 10,000 cycles. The test is initiated until completion of the cycles. Once completed, the test sample is formed into a bag. The bag is placed in a vacuum chamber filled with water, and the pressure in the chamber is decreased down to a pressure of 213 mbar (atmospheric pressure—800 mbar) that cause the bag to inflate. Air escapes from the holes, which are then counted. The number of holes in the sample is the value of the sheet's flex crack resistance. The lower the number of holes, the better the flex crack resistance.

In a class of embodiments, the sheets may have a flex crack resistance ≤7 holes/10,000 cycles, a flex crack resistance ≤6 holes/10,000 cycles, a flex crack resistance ≤5 holes/10,000 cycles, a flex crack resistance of ≤4 holes/10,000 cycles, a flex crack resistance of ≤3 holes/10,000 cycles, a flex crack resistance ≤2 holes/10,000 cycles, or a flex crack resistance ≤1 hole/10,000 cycles.

In any of the embodiments described herein, the sheet may be measured for Dart Drop Impact or Dart Drop Impact Strength (DIS), reported in grams (g), (g/mil), or (g/μm) and measured as in accordance with ASTM D-1709, method B. The dart head is phenolic. It calculates the impact failure weight, i.e., the weight for which 50% of the test specimens will fail under the impact.

In a class of embodiments, the sheets may have a dart drop impact strength (DIS) of ≥500 g/mil, a dart drop impact strength (DIS) of ≥750 g/mil, a dart drop impact strength (DIS) of ≥1,000 g/mil, a dart drop impact strength (DIS) of ≥1,500 g/mil, a dart drop impact strength (DIS) of ≥2,000 g/mil, or a dart drop impact strength (DIS) of ≥2,250 g/mil.

In other embodiments, the sheets may have a dart drop impact strength (DIS) of ≥19 g/μm, a dart drop impact strength (DIS) of ≥40 g/μm, a dart drop impact strength (DIS) of ≥50 g/μm, a dart drop impact strength (DIS) of ≥60 g/μm, a dart drop impact strength (DIS) of ≥70 g/μm, a dart drop impact strength (DIS) of ≥80 g/μm, or a dart drop impact strength (DIS) of ≥180 g/μm.

In yet other embodiments, the sheets may have a dart drop impact strength (DIS) of ≥475 g, a dart drop impact strength (DIS) of ≥1,500 g, a dart drop impact strength (DIS) of ≥2,000 g, a dart drop impact strength (DIS) of ≥2,200 g, a dart drop impact strength (DIS) of ≥2,500 g, a dart drop impact strength (DIS) of ≥3,000 g, a dart drop impact strength (DIS) of ≥3,500 g, a dart drop impact strength (DIS) of ≥4,000 g, a dart drop impact strength (DIS) of ≥4,500 g, or a dart drop impact strength (DIS) of ≥5,000 g.

In a class of embodiments, the sheets may have a tensile strength (as measured as stated below) of ≥10 lbf/in, a tensile strength of ≥13 lbf/in, a tensile strength of ≥15 lbf/in, a tensile strength of ≥20 lbf/in, a tensile strength of ≥25 lbf/in, a tensile strength of ≥35 lbf/in, a tensile strength of ≥45 lbf/in, a tensile strength of ≥50 lbf/in, a tensile strength of ≥55 lbf/in, or a tensile strength of ≥60 lbf/in.

Test Methods

The properties cited below were determined in accordance with the following test procedures. Where any one of these properties is referenced in the appended claims, it is to be measured in accordance with the following, specified test procedure.

Melt Strength A Melt Strength experiment is conducted at 190° C. using a Rheotester 1000 capillary rheometer in combination with the Rheotens 71.97 (Göttfert) instrument with an acceleration speed of 2.4 mm/s$^2$, while the small-angle oscillatory shear data at 190° C. was obtained from an ARES instrument using a plate-plate geometry with a 25 mm diameter.

1% Secant Modulus For 1% Secant Modulus, MPa (psi) a method based upon ASTM-D882-10 was utilized. The test was conducted on the United testing systems, six (6) station, and 60 Degree machine. The specimens are conditioned and tested under ASTM conditions. They are maintained at 23±2° C. and 50%±10% relative humidity. Conditioning time is a minimum of 40 hours and 48 hours after manufacturing. A total of 12 specimens of each material; six in the machine direction (MD) and six in the transverse direction (TD) were tested. The average 1% Secant Modulus ($MD_{average}+TD_{average}/2$) is calculated in psi (English unit).

Tensile Strength The tensile test for 250 microns (10 mil) and higher gauge films were conducted according to ASTM D882-12 with sample preparation and reporting procedures based upon ASTM E154-08a and ASTM E1745-11 respectively. The average tensile strength at break (lbf/in of width), average tensile strength at break (psi), and average elongation at break (%) are calculated for the machine and transverse direction.

Dart Drop Impact Strength The dart impact resistance for 250 microns (10 mil) and higher gauge films were measured by the Free-Falling Dart method (ASTM D1709-15a, Method B, stainless steel). The test was conducted at 23° C., 50% relative humidity after conditioning the samples at 40+ hrs @ 23° C. and 50% relative humidity. For the test, the impact failure weight ($F_{50}$, grams), the weight at which 50% failure and 50% pass occurs is reported. F=0 or $F_0$ is defined as the maximum drop weight possible on the instrument at which the samples reported all 10 pass (with 0 failure).

Tear The tear test of 125 microns (5 mil) film sheets in the machine and transverse direction was tested using a ProTear Elmendorf Tearing Tester based upon ASTM D 1922-15 method. The average tear ($MD_{average}+TD_{average}/2$) is reported in grams.

Permeance For estimation of water vapor transmission rate (WVTR, g/m2-day) on 125-250 μm (5-10 mil) films, a method using a Permatran W-700 manufactured by MOCON was utilized for the measurements. The test was conducted at 37.8° C., 760 mm Hg barometric pressure and 100% relative humidity. The WVTR values are converted into permeance in metric perms ($gm/m^2$-24 hr·Hg mm) and perms (Grains/$ft^2$·hr·inHg).

EXAMPLES

It is to be understood that while the invention has been described in conjunction with the specific embodiments thereof, the foregoing description is intended to illustrate and not limit the scope of the invention. Other aspects, advantages and modifications will be apparent to those skilled in the art to which the invention pertains.

Therefore, the following examples are put forth so as to provide those skilled in the art with a complete disclosure and description and are not intended to limit the scope of that which the inventors regard as their invention.

Example 1

PE 1 resin was made according to U.S. Patent Application Publication No. 2015/0291748, inventive examples, referencing U.S. Pat. No. 6,956,088, and using the bis(n-propylcyclopentadienyl)$HfCl_2$/MAO catalyst system disclosed therein under polymerization conditions to produce the polyethylene polymer as described herein. These polymer properties were obtained by varying the polymerization conditions and/or hydrogen concentration as known to those skilled in the art.

PE 1 had a density of 0.916 g/$cm^3$, a melt index ($I_{2.16}$) of 0.5 g/10 min, a melt index ratio ($I_{2.16}/I_{2.16}$) of 30. These samples were evaluated along with Exceed™ mPE 1018HA, all mLLDPE, LL 1001 LL 3001 grades available from ExxonMobil Chemical Company, Houston, Tex.

Figure 1A:
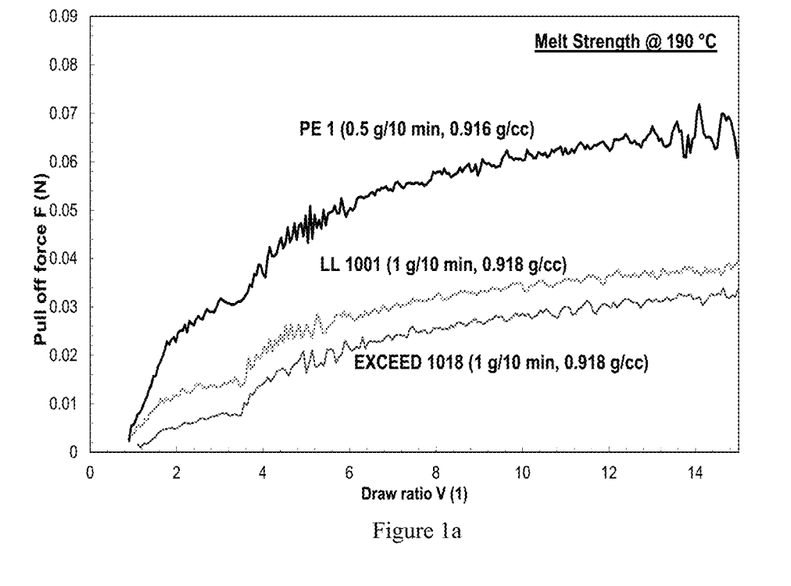
FIG. 1a is a plot of melt strength for certain polyethylene examples.
Figure 1B:
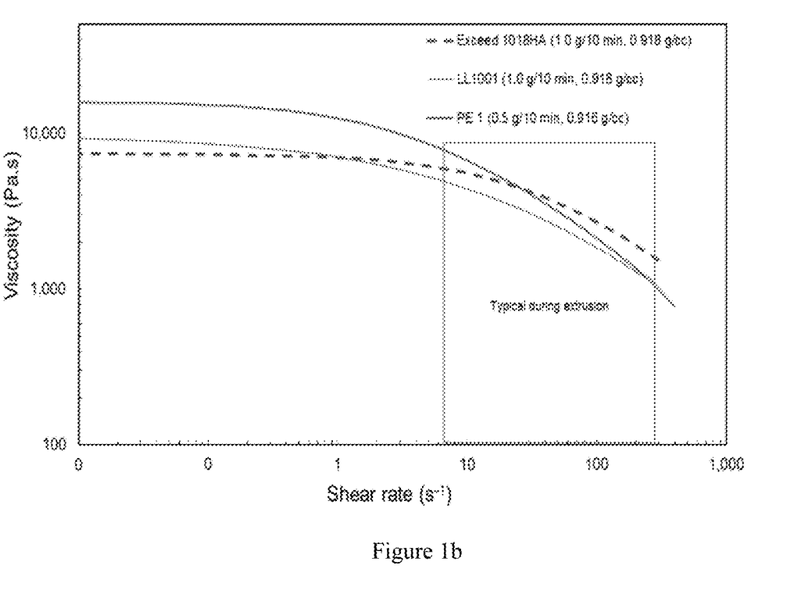
FIG. 1b is a plot of shear thinning for certain polyethylene examples.

PE 1 (0.916 g/cc, 0.5 MI, 30 MIR) and Z-N LL 1001.31 (0.918 g/cc, 1 MI), available from ExxonMobil Chemical Company, Houston, Tex., were used in the fabrication of sheets. The high melt strength and shear thinning of the resin, represented by the melt strength and small angle oscillatory shear data in FIGS. 1a and 1b respectively, offer an excellent combination of melt strength and shear thinning that favors superior bubble stability and processability for blown film.

The neat PE 1 and PE 1/Z-N $C_4$-LL 1001 blend sheets were made in an Alpine Hosokawa blown film/sheet line with a 90 mm groove feed extruder, 160 mm die diameter, 1.5 mm (60 mil) die gap and 136.1 kg/hr (300 lb/hr) feed rate. Sheet attributes of neat PE 1 and 70/30 (wt %) PE 1/$C_4$-LL1001 fabricated with a 127 μm (5 mil) gauge are provided in Table 1. Both neat and blend sheets show excellent modulus, tear strength, and permeance.

Figure 2:
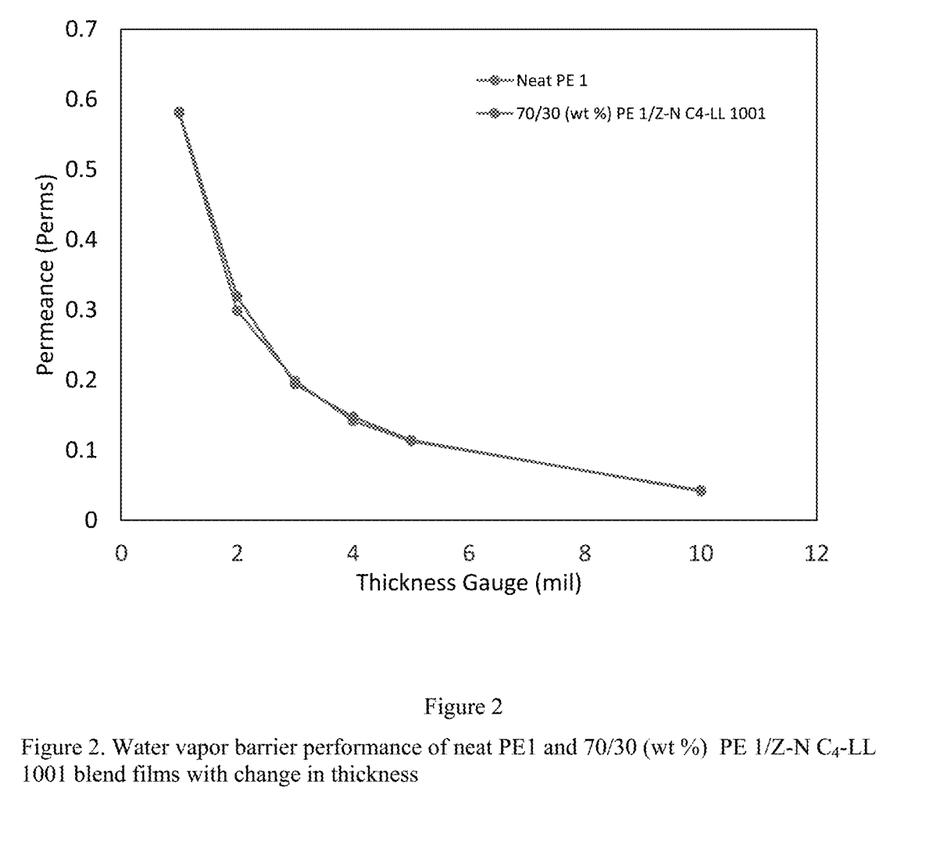
FIG. 2 is a plot of permeance for PE 1 and a PE 1 blend.

FIG. 2 shows the permeance data for the neat PE 1 and 70/30 (wt %) PE 1/Z-N $C_4$-LL 1001 blend sheets with the change in thickness. The permeance start to show lower values (0.1 Perms for Class A construction sheets) and is noted to meet the Class A of ASTM E 1745 standard for permeance greater than 5 mils (127 μm) gauge.

TABLE 1

|  | PE 1 127 μm (5 mil) gauge | 70/30 (wt %) PE 1/ $C_4$-LL1001, 127 μm (5 mil) gauge |
| --- | --- | --- |
| Output, kg/hr (lbs/hr) | 136.1 (300) | 136.1 (300) |
| Melt Pressure (psi) | 8005 | 7645 |
| Melt temp. (° F.) | 434.7 | 433.9 |
| BUR | 2.5 | 2.5 |
| FLH, mm (in) | 762 (30) | 711 (28) |
| Average 1% Secant Modulus, MPa (psi) | 195.24 (28317) | 195.15 (28305) |
| Average Tear (MD + TD)/2, g | 1437 | 1771 |
| Permeance, metric Perms (Perms) | 0.0723 (0.11) | 0.0723 (0.11) |

Example 2

Table 2 shows the tensile data of 10 mil gauge sheets made from neat PE 1 resin, 90/10 (wt %) PE 1/Fractional melt index LDPE, and a 70/30 (wt %) PE 1/Z-N $C_4$-LL 1001 blend. The strength (lbf/in) values display values exceeding the Class A construction standard of 45 lbf/in (ASTM E-1745).

TABLE 2

| Sample ID | | Average Tensile Strength at Break kN/m (lbf/in) Force per unit width) | Average Tensile Strength at Break, MPa (psi) | Elongation at Failure (%) |
|---|---|---|---|---|
| PE 1-100% | MD | 11.31 (64.4) | 45.64 (6620) | 1000 |
|  | TD | 10.43 (59.4) | 46.27 (6710) | 940 |
| 90/10 (wt %) PE 1/ | MD | 10.41 (59.3) | 43.02 (6240) | 950 |
| Fractional melt index LDPE | TD | 9.87 (56.2) | 43.3 (6280) | 940 |
| 70/30 (wt %) | MD | 10.97 (62.5) | 42.27 (6130) | 980 |
| PE 1/Z-N C$_4$-LL 1001 | TD | 11.55 (65.8) | 44.82 (6500) | 1000 |

Example 3

Table 3 shows the dart impact resistance measured as stated above. The dart drop test was stopped due to the limitation of the equipment designed for this test. Based on the F=0 (all-pass drop weight) of 2573 g for neat PE 1 and 90/10 (wt %) PE 1/Fractional melt index LDPE and 2453 g for 70/30 (wt %) PE 1/Z-N C4-LL 1001 blend sheets, it can be extrapolated that the 10 mil gauge sheets show much higher drop impact resistance (F50), most likely in the 3000-5000 g range that would be unattainable at these gauges for a similar sheet made from a PE resin or resin blend at substantially the same density and melt index.

TABLE 3

| Sample ID | Average Thickness (mm) | Thickness range (mm) | Impact Failure Weight, F$_{50}$ (g) | Pass | Fail | F$_0$ (g), All pass |
|---|---|---|---|---|---|---|
| PE 1-100% | 0.236 | 0.096 | >2573# | 10 | 0 | 2573 |
| 90/10 (wt %) PE 1/ Fractional melt index LDPE | 0.228 | 0.052 | >2573# | 10 | 0 | 2573 |
| 70/30 (wt %) PE 1/Z-N C$_4$-LL 1001 | 0.245 | 0.092 | >2453 | 4 at 2453 g, 1 at 2483 g, 1 at 2513 g, 2 at 2543 g, 8 at 2573 g | 3 at 2483 g, 1 at 2573 g | 2453 |

*PE 1 measured dart at maximum of test method

Example 4

Table 4 summarizes the ASTM E 1745 Class A requirements and the values noted for neat PE 1, 90/10 (wt %) PE 1/Fractional melt index LDPE, and 70/30 (wt %) PE 1/Z-N C$_4$-LL 1001 blended sheets of PE 1 resins either used alone or blended with another PE resin in different ratios. These examples exceed the Class A construction standard. Thus, the PE 1 resin is expected to provide opportunities for blending with LDPE, other LLDPE, and regrind material and maintain the properties to meet the construction liners standard. The resin can also provide downgauging opportunities when extruded as a monolayer or coextruded with other resins.

Additionally, the combination of tensile strength, puncture resistance, permeance, and stiffness of the neat PE 1 and PE 1 blend sheets offers superior sheets for extreme damage resistance liners that are used in the construction industry, for example, as underslab liners and wall liners. The PE 1 also resin offers excellent bubble stability and processability. These excellent properties at different gauge variations (e.g., 5 mil to greater than 30 mil) also provide opportunities where extreme damage resistance is required.

TABLE 4

| Properties | Test Method | ASTM E 1745 Class A Requirements, English (SI) | PE 1, English (SI) | 70/30 PE 1/ C4-LL Blend English (SI) | 90/10 PE 1/ FMI LDPE |
|---|---|---|---|---|---|
| Nominal Thickness | — | — | 10 mil/254 μm | 10 mil/254 μm | 10 mil/254 μm |
| Avg. Tensile Strength (MD + TD)/2 | ASTM E 154, Section 9 (ASTM D882) | 45 lbf/in (7.9 kN/m) | 61.9 lbf/in (10.84 kN/m) | 64.15 (11.23 kN/m) | 57.8 (10.12 kN/m) |
| Puncture Resistance | ASTM D1709, Method B, F$_{50}$ | 2200 g | >2573 g | >2453 g | >2573 g |
| Permeance (Perms) Grains/ ft$^2$ · hr · inHg (Perms) | Internal Method (37.8°C, 760 mm Hg, 100% RH) | 0.1 | 0.0429 | 0.042 | 0.0451 |

The phrases, unless otherwise specified, "consists essentially of" and "consisting essentially of" do not exclude the presence of other steps, elements, or materials, whether or not, specifically mentioned in this specification, so long as such steps, elements, or materials, do not affect the basic and novel characteristics of the invention, additionally, they do not exclude impurities and variances normally associated with the elements and materials used.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All priority documents are herein fully incorporated by reference for all jurisdictions in which such incorporation is permitted and to the extent such disclosure is consistent with the description of the present invention. Further, all documents and references cited herein, including testing procedures, publications, patents, journal articles, etc. are herein fully incorporated by reference for all jurisdictions in which such incorporation is permitted and to the extent such disclosure is consistent with the description of the present invention.

While the invention has been described with respect to a number of embodiments and examples, those skilled in the art, having benefit of this disclosure, will appreciate that other embodiments can be devised which do not depart from the scope and spirit of the invention as disclosed herein.

What is claimed is:

1. A sheet made from at least one metallocene-catalyzed polyethylene polymer comprising from 75.0 mol % to 100.0 mol % ethylene derived units and having:
 a density of from 0.910 g/cm³ to 0.923 g/cm³,
 a melt index ($I_{2.16}$) of from 0.1 g/10 min to 1.2 g/10 min,
 a melt index ratio ($I_{21.6}/I_{2.16}$) of from 28 to 35,
 a CDBI of 20% to <50%;
 an orthogonal comonomer distribution, wherein the polyethylene polymer has a molecular weight range and polymer fractions across the molecular weight range vary by more than 10 wt %, and/or at least a first peak and at least a second peak in a comonomer distribution analysis, wherein the first peak has a maximum at a log ($M_w$) value of 4.0 to 5.4, and the second peak has a maximum at a log ($M_w$) value of 5.0 to 6.0, and
 a weight average molecular weight ($M_w$) of from 150,000 g/mol to 400,000 g/mol;
 wherein:
  the sheet has a thickness of ≥20 mil (508 μm), has a dart drop impact strength (DIS) of ≥2,200 g, a permeance of ≤0.1 perms, and comprises a blend of the polyethylene polymer and at least one additional polymer, wherein the at least one additional polymer is a Ziegler-Natta linear low density polyethylene polymer having a density of from 0.915 g/cm³ to 0.940 g/cm³ and a melt index ($I_{2.16}$) of from 0.1 g/10 min to 1.0 g/10 min.

2. The sheet of claim 1, wherein the sheet has a tensile strength of ≥45 lbf/in (7.9 kN/m).

3. The sheet of claim 1, wherein the sheet has a tensile strength of ≥61.9 lbf/in (10.84 kN/m).

4. The sheet of claim 1, wherein the sheet has a dart drop impact strength (DIS) of ≥2,500 g.

5. The sheet of claim 1, wherein the sheet has a dart drop impact strength (DIS) of ≥3,000 g.

6. The sheet of claim 1, wherein the sheet has zero failures (F=0) at a dart drop impact strength (DIS) of at least 2,200 g or greater.

7. The sheet of claim 1, wherein the sheet has a permeance of ≤0.05 perms.

8. The sheet of claim 1, wherein the polyethylene polymer has a density of from 0.910 g/cm³ to 0.920 g/cm³.

9. The sheet of claim 1, wherein the polyethylene polymer has a melt index ($I_{2.16}$) of from 0.2 g/10 min to 1.1 g/10 min.

10. The sheet of claim 1, wherein the polyethylene polymer has a melt index ($I_{2.16}$) of from 0.4 g/10 min to 1.0 g/10 min.

11. The sheet of claim 1, wherein the polyethylene polymer has a melt index ratio ($I_{21.6}/I_{2.16}$) of from 28 to 32.

12. The sheet of claim 1, wherein the polyethylene polymer has a melt index ratio ($I_{21.6}/I_{2.16}$) of from 28 to 31.

13. The sheet of claim 1, wherein the polyethylene polymer has a melt strength of from 1 to 25 cN.

14. The sheet of claim 1, wherein the polyethylene polymer has a melt strength of from 3 to 15 cN.

15. The sheet of claim 1, wherein the sheet comprises two or more layers.

16. The sheet of claim 15, wherein the two or more layers comprise at least one skin layer, a core layer, and optionally, one or more intermediary layers.

17. The sheet of claim 16, wherein at least one of the skin layer, the core layer, or optional intermediary layer comprises from 30 wt % to 100 wt % of the polyethylene polymer, based upon the total weight of the skin layer, the core layer, or optional intermediary layer.

18. The sheet of claim 16, wherein at least one of the skin layer, the core layer, or optional intermediary layer comprises from 50 wt % to 100 wt % of the polyethylene polymer, based upon the total weight of the skin layer, the core layer, or optional intermediary layer.

19. An industrial or construction liner comprising the sheet of any one of claim 1.

* * * * *